United States Patent
Wong et al.

[11] Patent Number: 5,912,446
[45] Date of Patent: Jun. 15, 1999

[54] CARD READER WITH CARRIAGE POWERED BY MOVEMENT OF INSERTED CARD

[75] Inventors: Yiu Kong Wong, Richmond Hill; David Henry Groves, Adjala; Martin Frederick Hemy, Palgrave, all of Canada

[73] Assignee: International Verifact Inc.

[21] Appl. No.: 08/713,235

[22] Filed: Sep. 12, 1996

Related U.S. Application Data

[63] Continuation-in-part of application No. 08/418,302, Mar. 27, 1995, Pat. No. 5,559,317.

[51] Int. Cl.⁶ .................................................. G06K 7/08
[52] U.S. Cl. ........................... 235/449; 235/475; 235/482
[58] Field of Search .................................. 235/380, 449, 235/475, 479, 482; 360/2, 101; 369/31, 63, 68, 177

[56] References Cited

U.S. PATENT DOCUMENTS

| | | | |
|---|---|---|---|
| 3,866,827 | 2/1975 | Obata et al. | 235/449 |
| 3,940,796 | 2/1976 | Haun et al. | 235/449 |
| 3,953,887 | 4/1976 | Kobylarz et al. | 235/449 |
| 3,976,858 | 8/1976 | Haun | 235/479 |
| 4,048,476 | 9/1977 | Lawter et al. | 235/479 |
| 4,447,898 | 5/1984 | Koike | 369/65 |
| 4,529,872 | 7/1985 | Dinges | 235/482 |
| 4,670,643 | 6/1987 | Hain et al. | 235/475 |
| 4,990,758 | 2/1991 | Shibano et al. | 235/441 |
| 5,331,138 | 7/1994 | Saroya | 235/449 |

*Primary Examiner*—Donald Hajec
*Assistant Examiner*—Mark Tremblay

[57] ABSTRACT

The transaction terminal receives and reads information maintained on the card in a magnetic stripe or in an integrated circuit. A carriage is moved by an inserted card and moves from an initial position to a read position. The carriage is powered by the inserted card, and when the card is in the read position, the carriage is released and a magnetic head scans a magnetic stripe provided on the card. The terminal also causes an electrical connector to engage a card in the read position and form an electrical circuit with an integrated circuit if the card is a Smart Card. If a card is partially inserted, the carriage is held and does not automatically return to the initial position. Preferably, a series of carriage hold positions are provided between the initial position and the read position. The terminal works in the same manner regardless of what type of card is used. In this way, the user merely fully inserts the card in the appropriate manner.

13 Claims, 9 Drawing Sheets

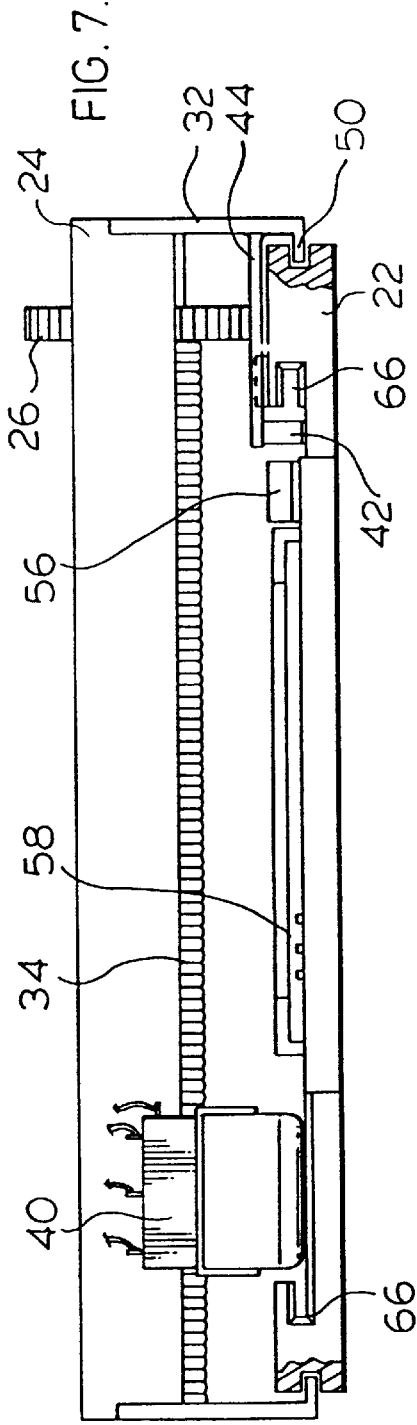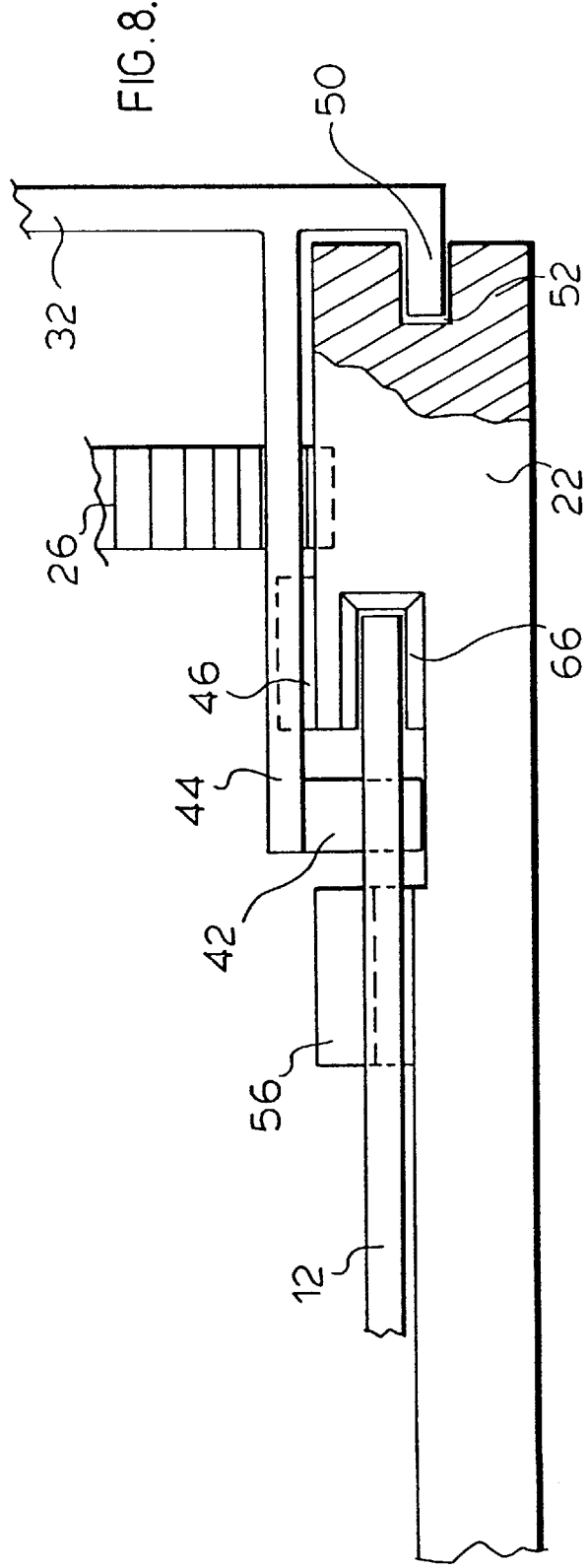

CARD READER WITH CARRIAGE POWERED BY MOVEMENT OF INSERTED CARD

CROSS-REFERENCE TO RELATED APPLICATIONS

This application is a continuation-in-part of application Ser. No. 08/418,302 filed Mar. 27, 1995, U.S. Pat. No. 5,559,317.

FIELD OF THE INVENTION

The present invention relates to an interface of a card reader for reading information stored on a stripe of the card. In a preferred embodiment the interface also accommodates an IC reader/writer.

BACKGROUND OF THE INVENTION

Credit cards and debit cards normally have a magnetic stripe adjacent one edge thereof and this magnetic stripe stores certain information with respect to the card. Some of these cards also include an integrated circuit (IC) chip which is embedded in the plastic card. A card of this type is commonly referred to as a "Smart card". The integrated circuit allows for the storage of additional information and in addition to allowing reading of information contained in the chip, it also allows information to be written to the chip. In this way, the card can be updated.

There are a number of different arrangements for reading of magnetic stripe cards from manual readers to automated readers. Perhaps the most common reader is a "swipe" reader where the card is manually forced through a card slot past a magnetic read head. The motion of sliding or swiping the card past a magnetic read head allows the read head to read information contained on the magnetic stripe. Accurate reading of the information most commonly occurs when the card is guided at constant velocity past the read head or is moved past the read head without sudden changes. For example, the card can be accelerating past the read head and as long as the acceleration is generally smooth, accurate reading of the card can occur. Problems occur when there is a sudden change in the velocity or acceleration of the card.

To overcome the problems associated with "swipe" readers, a number of manual and motor-driven systems have been proposed. In such systems, the card is inserted into a slot to an operating position where the read head is driven along the magnetic stripe. Motorized arrangements include some sort of carriage or drive arrangement for moving the head relative to the stripe at essentially constant velocity for reading of information. These types of systems work well and the only major drawbacks are with respect to cost and higher maintenance due to the higher degree of mechanization.

A number of manual readers use some sort of spring biasing means having one end connected to a movable carriage and the other end of the spring connected to the support housing. Potential energy is developed in the spring as the carriage is moved from an initial position to a second position when the card is fully inserted into the device. The carriage is then released and moves over the card and along the magnetic stripe. These systems have not proven entirely satisfactory and are limited by the extent of relative movement of the carriage.

A further type of card reader is known as "a dip" reader. In this structure, the card is fully inserted into a slot and the reading step is carried out when the card is removed from the device. Some people believe it is easier to smoothly remove the card from the device rather than swipe it past a magnetic head. These type of readers suffer from the same problems as "swipe" readers.

Example of various card readers are disclosed in the following U.S. Patents: U.S. Pat. No. 4,833,310; U.S. Pat. No. 4,048,476; U.S. Pat. No. 4,423,320; U.S. Pat. No. 4,575,703; U.S. Pat. No. 3,976,858; U.S. Pat. No. 4,581,523; U.S. Pat. No. 3,940,796; U.S. Pat. No. 3,866,827; and, U.S. Pat. No. 4,529,872.

U.S. Pat. No. 4,529,872, in particular, describes a magnetic card reader for reading signals recorded on the magnetic stripe of a card. The reading head is mounted on a supporting body contained within a housing and the card is inserted through a slot in the housing to engage a stop on the supporting body. The stop and the supporting body are moved against the force of a spiral spring until the supporting body reaches an end position within the housing where the stop engages a counterstop to lower the stop beneath the magnetic card. The supporting body thereby is released for return movement in response to the force of the spring and the magnetic stripe on the card is read during the return movement.

SUMMARY OF THE INVENTION

A transaction terminal according to the present invention cooperates with transaction cards including magnetic stripe cards and cards having an integrated circuit for storing data. The transaction terminal comprises a card entry slot for receiving an orientated transaction card which guides the card to a read position, a movable carriage biased towards the card entry slot and movable with a transaction card away from an initial position at the entry slot to a carriage release point when a card is inserted in the slot and moved by a user to the read position. The carriage includes a read head positioned for reading a magnetic stripe on a transaction card when the carriage moves under the bias from the carriage release position to the initial position. The transaction terminal includes electrical connectors positioned to engage and form an electrical circuit with an integrated circuit of a transaction card when the transaction card is in the read position. The transaction terminal cooperates with transaction cards having only magnetic stripes and cooperates with transaction cards having integrated circuits such that each transaction card inserted to the read position has the carriage and magnetic head moved from the release position to the initial position and the electrical connectors contact the transaction card to attempt to form an electrical circuit with the transaction card.

According to an aspect of the invention the transaction terminal, between the initial position and the release position, includes at least one hold position stopping the carriage from returning to the initial position before being released at the release position.

According to a further aspect of the invention, the carriage slides over a base and the base receives the transaction cards. The base further includes ratchet teeth, with each ratchet tooth forming a hold position. The carriage includes a free arm which cams over the ratchet teeth when the carriage is moved from the initial position to the release position. The free arm at the release position cooperates with the card and a cam on the base to move to a position clear of the ratchet teeth allowing the carriage to move from the release position to the initial position when a card is in the read position.

A transaction terminal according to the invention comprises a base, a movable carriage having a magnetic read head, and a guideway provided in the base for receiving a transaction card and allowing movement of the transaction card from an initial position to a read position. The carriage includes a card engaging member position to engage a card and move the carriage as the card is inserted in the terminal and moved from the initial to the read position. The base at the read position cooperates with the carriage to release the carriage and allow the carriage to move in a predicted manner between the read position and the initial position and cause the head to scan, if present, a magnetic stripe provided on the transaction card. The transaction terminal further includes an electrical connector positioned to form an electrical circuit with an integrated circuit provided on a Smart card when the Smart card is in the read position. The transaction terminal, whenever a transaction card is fully inserted therein, causes the carriage to move in the predicted manner and causes the electrical connector to contact the card with the power for each of these actions being developed by the user inserting the card and moving it to the read position.

BRIEF DESCRIPTION OF THE DRAWINGS

The above as well as other advantages and features of the present invention will be described in greater detail according to a preferred embodiment of the present invention in which:

FIG. 7 is a front elevation view of the interface of FIG. 2;

FIG. 8 is an enlargement of the front elevation view of FIG. 7;

DETAILED DESCRIPTION OF THE PREFERRED EMBODIMENTS

Figure 1:
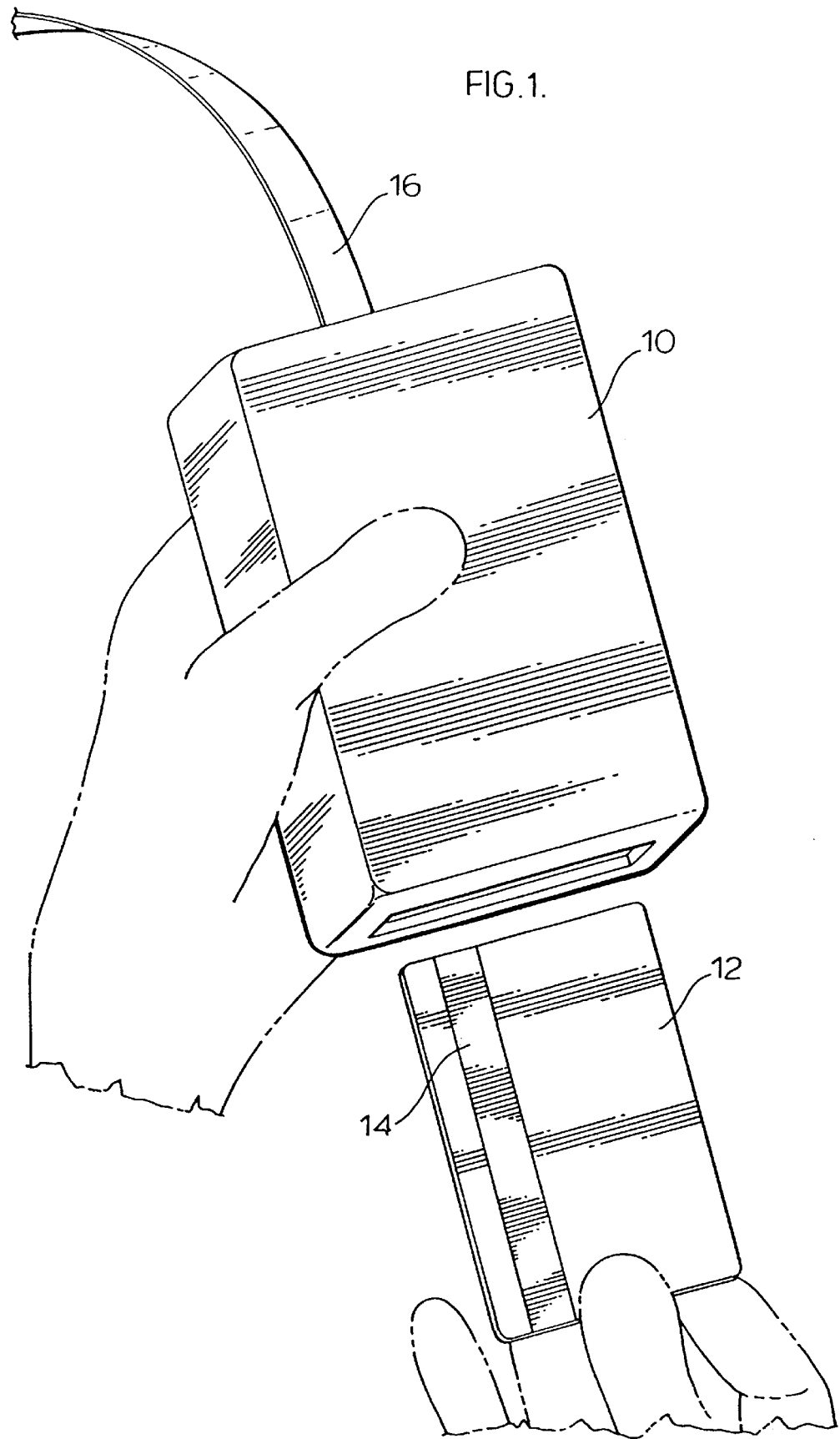
FIG. 1 is a perspective view of a card reader incorporating the interface of the present invention.

FIG. 1 illustrates a manually operated magnetic stripe reader shown at 10 incorporating the interface of the present invention. This interface can also be used for reading and writing to the IC of a Smart card. Reader 10 may be utilized for reading magnetic stripe cards 12. The card once inserted allows for both functions. Magnetic stripe cards 12 are provided with a magnetic stripe 14 having stored therein relevant information. The reader 10 reads the information on the magnetic stripe 14 and passes such information onto other devices (not shown) through the connecting cable 16. A Smart card typically has a magnetic stripe which is read by the interface as well as an IC for reading and writing information to the card. A separate electrical connection is made with the IC.

Figure 2:
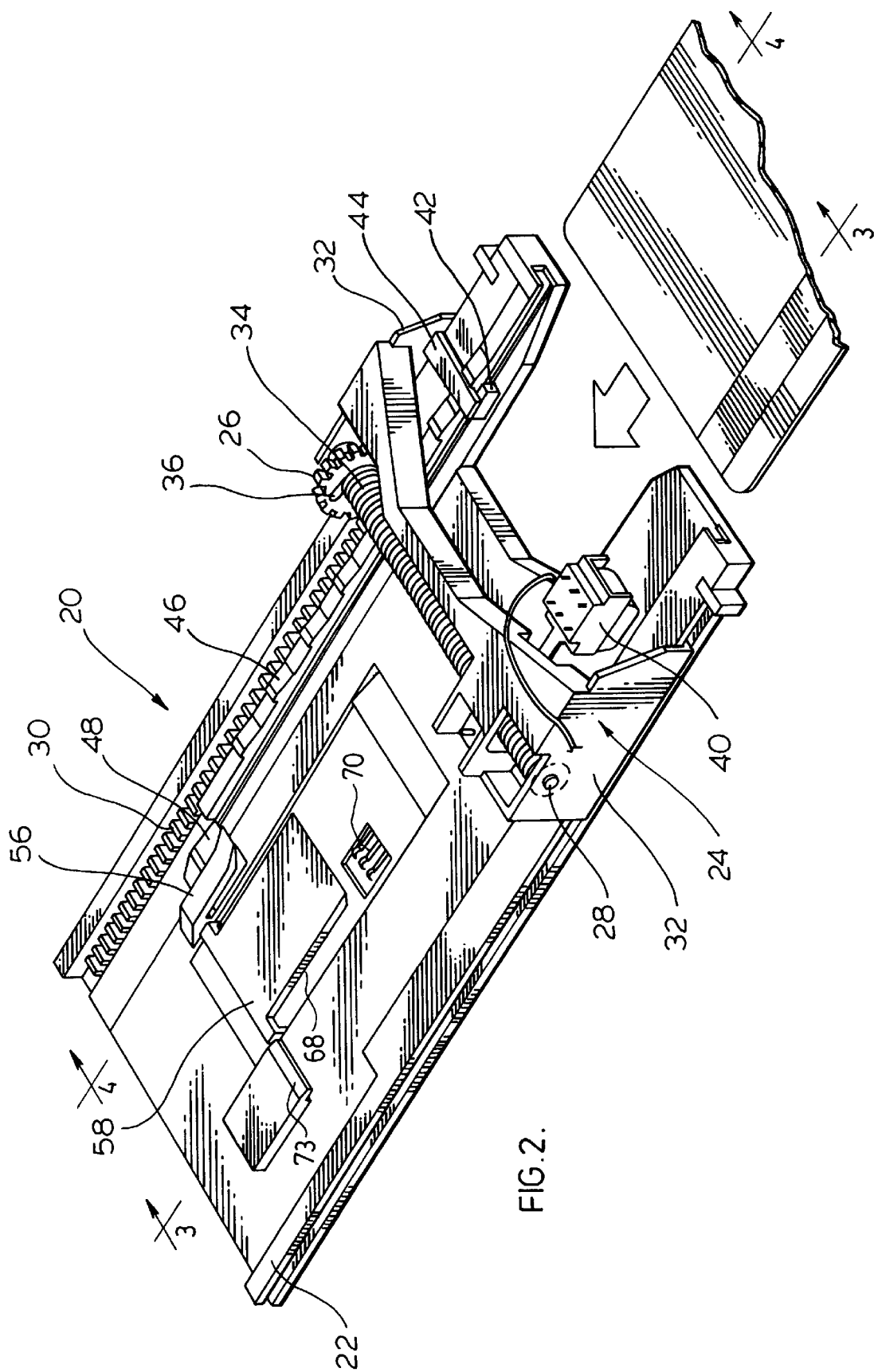
FIG. 2 is a perspective view of the card reader interface of the present invention.
Figure 3:
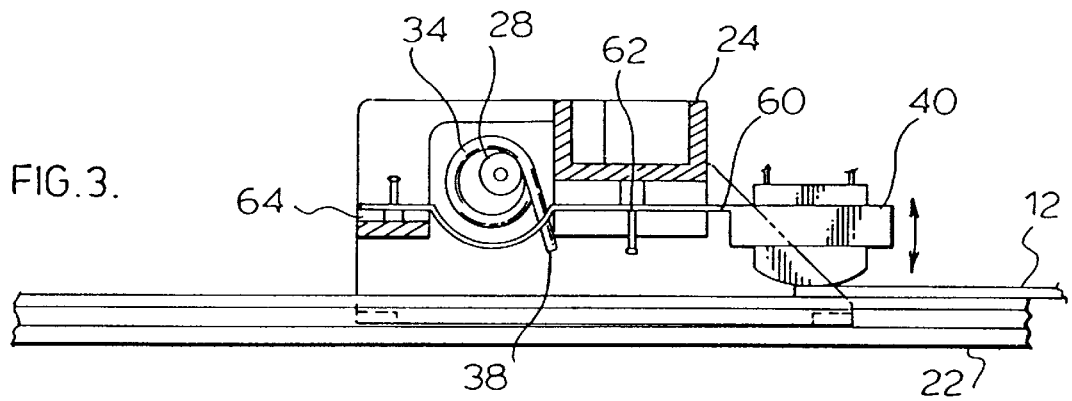
FIG. 3 is a cross section of the interface of FIG. 2 taken along line 3,3 of FIG. 2.
Figure 4:
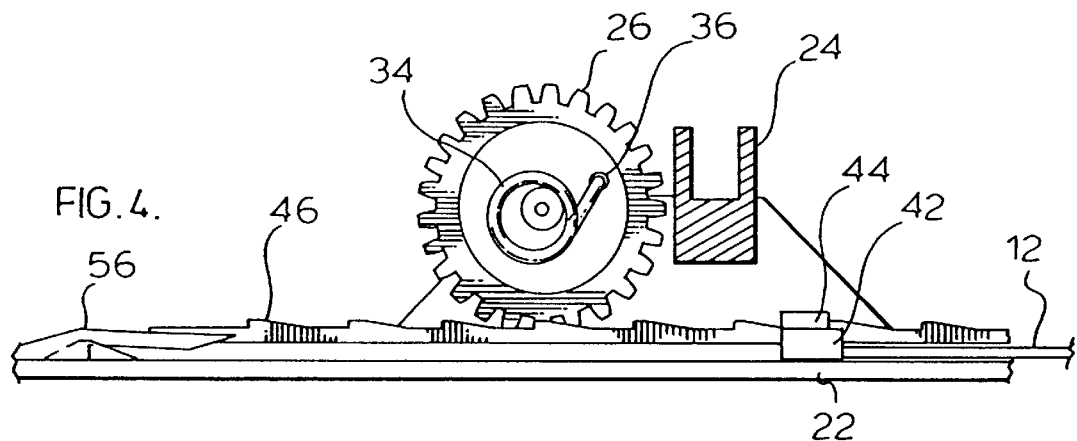
FIG. 4 is a cross section of the interface of FIG. 2 taken along line 4,4 of FIG. 2.
Figure 5:
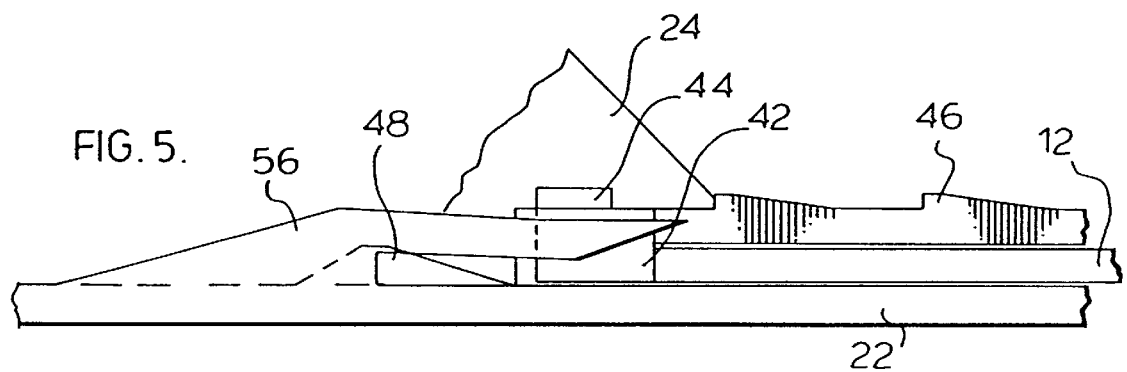
FIG. 5 is a close up side elevation view showing the details of the card gripping means of the interface of FIG. 2.
Figure 6:
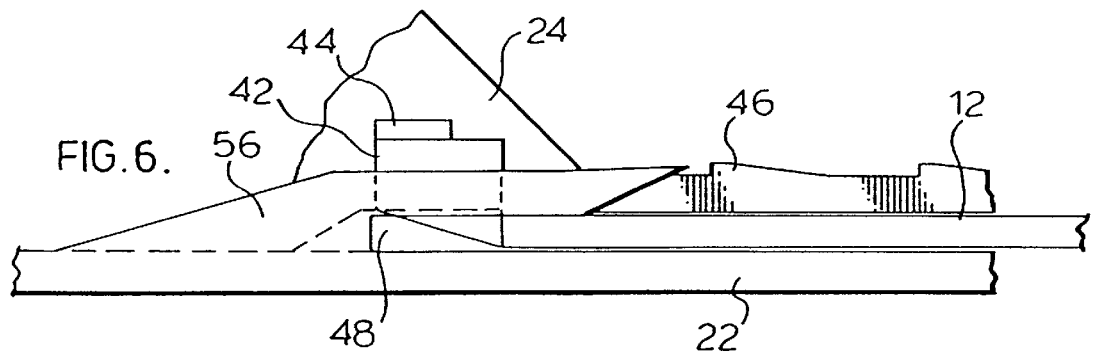
FIG. 6 is a close up side elevation view showing the details of the card gripping means of the interface of FIG. 2 in the action of gripping a card.

Details of the interface 20 and its operation are illustrated in FIGS. 2 though 11. Interface 20 has a base 22 on which is slidably mounted a carriage assembly 24. Carriage assembly 24 is provided with a roller gear 26 mounted on axle 28. Roller gear 26 is in meshing engagement with complementary rack gear 30 mounted on the base 22. The ends of the axle 28 are contained within ports in sides 32 of the carriage assembly 24. Roller gear 26 engages end 36 of the torsion spring 34 and causes a change in the windings 35 of the torsion spring when roller gear 26 rotates. The opposite end 38 of the torsion spring 34 is held in fixed engagement with the carriage assembly 24. Movement of the carriage causes a rotation of roller gear 26 and a change in the condition of the torsion spring 34.

Carriage assembly 24 has a magnetic read head 40 mounted in a proper position for reading the magnetic stripe 14 on a magnetic stripe card 12 which is inserted in the interface 20. Carriage assembly 24 is further provided with a card engaging means shown as stop 42 for engaging the edge of a card 12 inserted into the interface 20. Stop 42 is attached to the side 32 of the carriage assembly 24 by means of a flexible arm 44. This flexible arm 44 is positioned to ride along and be engaged by a series of ratchet teeth 46 provided on the base 22. Base 22 is also provided with a ramp 48 for releasing the carriage from drive engagement with a card.

Each side 32 of carriage assembly 24 is provided at a lower position with inwardly extending feet 50 which are retained in groove 52 provided each side of base 22. The feet basically float within the grooves 52 and guide the carriage during movement thereof. Carriage assembly 24 is slidably mounted on the base 22 by the feet 50 riding in the grooves 52 of the base 22. In order to prevent the carriage assembly 24 from disengaging from the base 22 during the return action, base 22 is provided with stops 54 at the front of the grooves 52 to limit the forward motion of the carriage assembly 24. Base 22 is also provided with a card gripping means 56 for gripping and holding the card when it is fully inserted into the interface 20 to a second position. Base 22 may also be provided with a contact area 58 for a Smart card located in an appropriate region for contacting the contacts on the Smart card when the card is inserted into the interface 20. Note the carriage is a truss-like structure which engages the sides of the base 22 leaving the upper and lower surfaces of the card accessible for connection with an IC of a Smart card. This can be important as not all IC's are located in the same place on a card.

The base is also provided with cam 73 for lifting of the read head 40 accommodated by its flexible spring arm 60. This allows the carriage to start to accelerate prior to the read head contacting the card. With this structure, jitter at the start of the sweep of the magnetic stripe is reduced.

Figure 9:
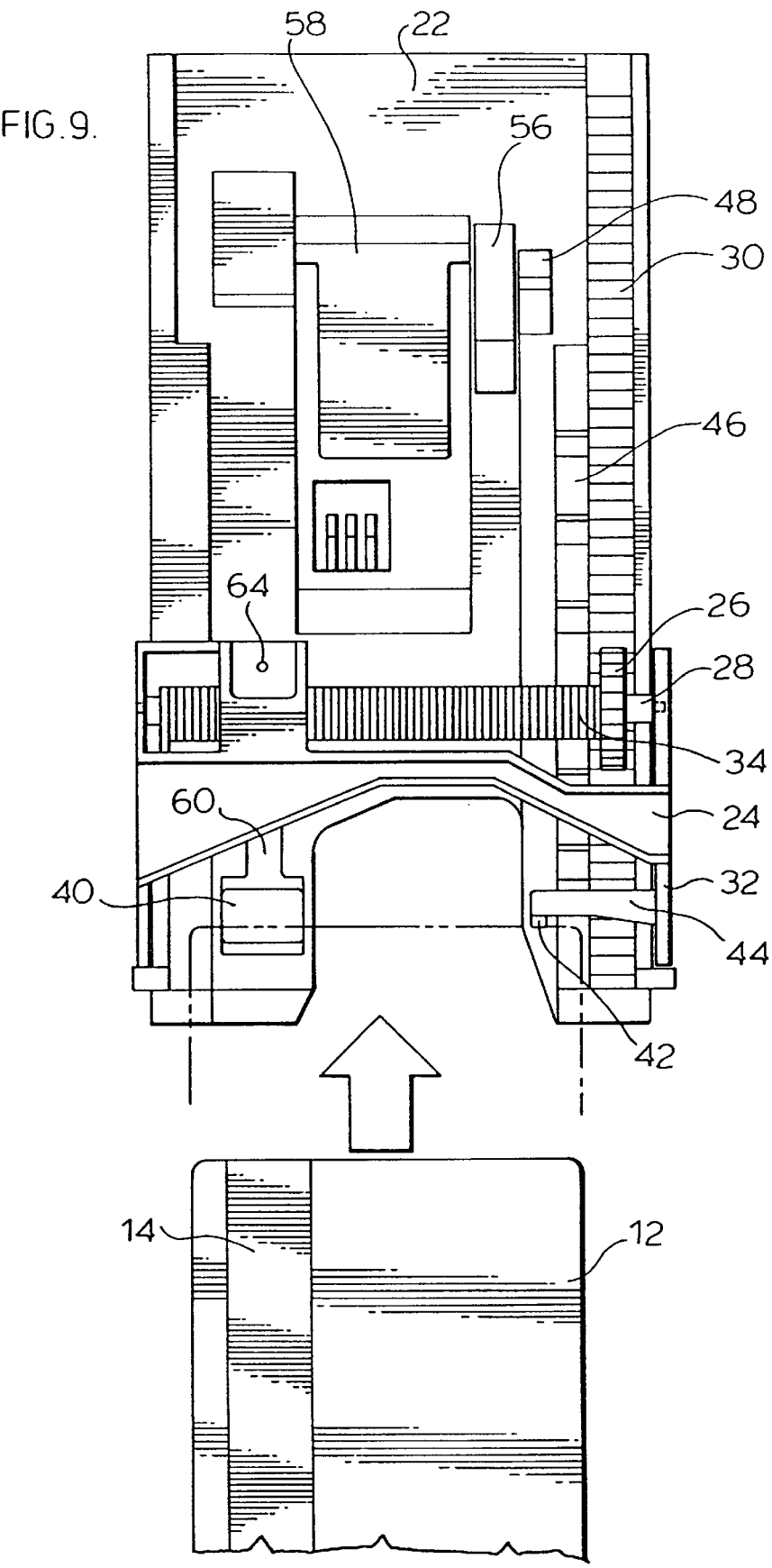
FIG. 9 is a top planar view of a card about to be entered into the interface of FIG. 2.
Figure 10:
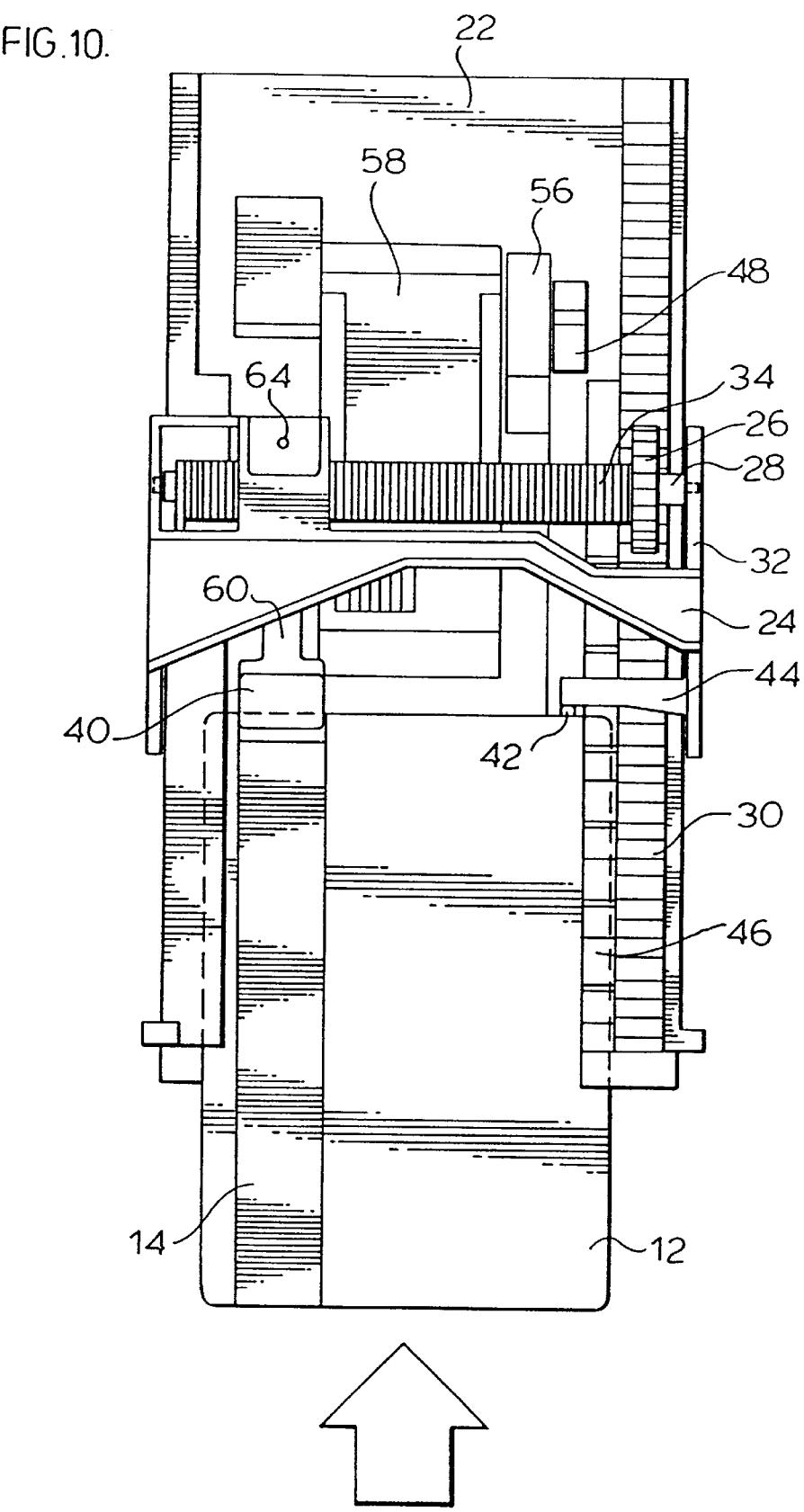
FIG. 10 is a top planar view of a card being inserted into the interface of FIG. 2.
Figure 11:
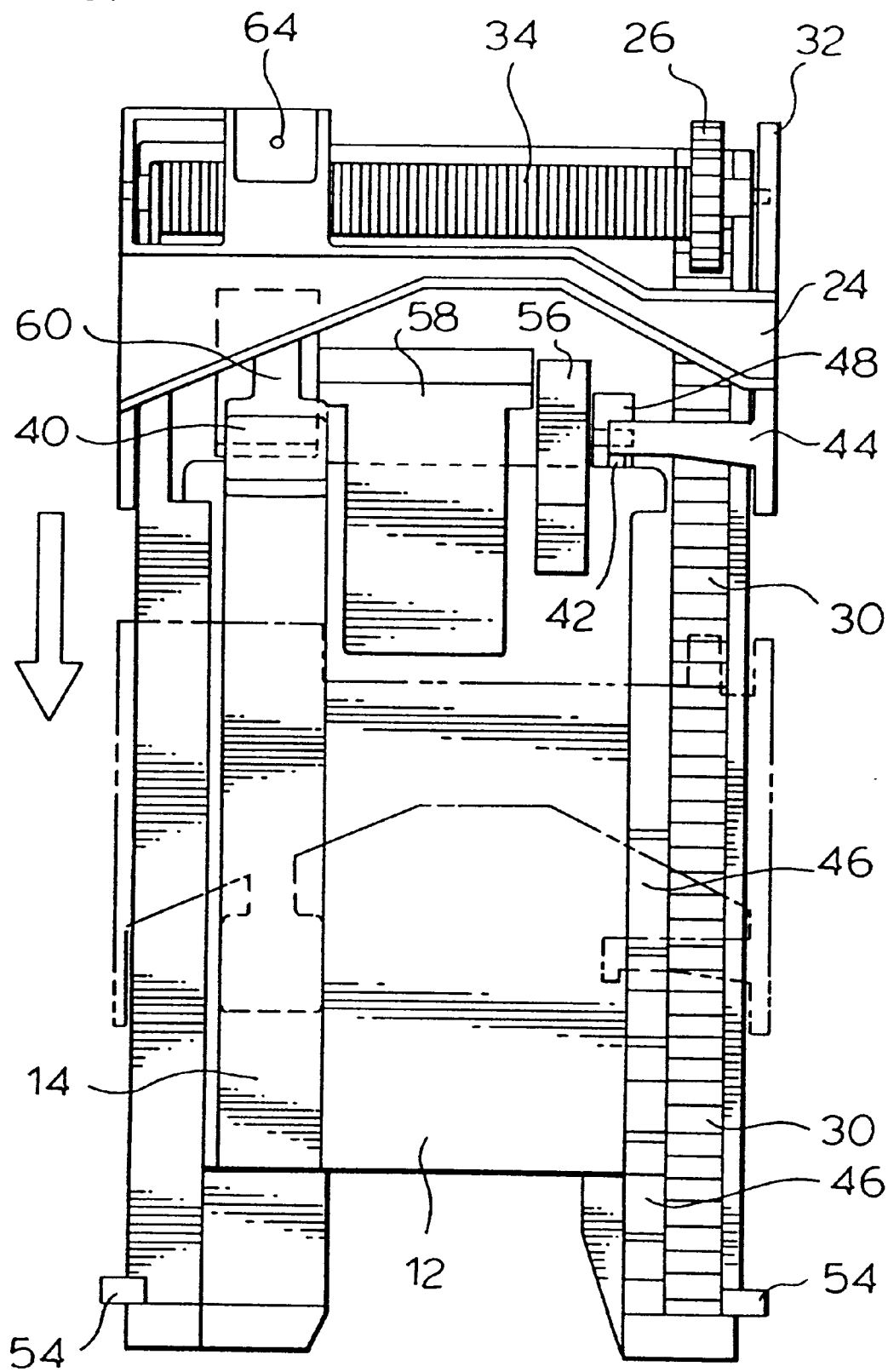
FIG. 11 is a top planar view of the interface of FIG. 2 with a card fully inserted into the interface.

In operation, as illustrated in FIGS. 2 and 9, the carriage assembly 24 is located at the front of the base 22 being held on the base by means of the complementary action of the feet 50 and the grooves 52 with the carriage assembly 24 resting against the stops 54 on the base. The torsion spring 34 is preloaded to maintain the positioning of the carriage assembly 24 in its initial position adjacent the card slot. The torsion spring 34 is designed such that in addition to being partially loaded when the carriage is in its initial position, the spring 34 operates within its linear range during the operation of the interface. The multiple winding torsion spring is further loaded by approximately two full rotations of the roller gear 26. The spring is preloaded in approximately four full rotations. The spring is easily operated in a range up to at least eight full rotations. Thus the spring is operating from a level of about 50 to 75 percent and this limited 25 percent is very predictable and linear. This renders the device very reliable and easily manufactured. The spring force easily moves the carriage assembly quickly and smoothly from the second position to the first position whereby an accurate read of the magnetic stripe is achieved.

When a magnetic stripe card 12 is inserted into the interface 20, the front edge of the card 12 initially contacts and partially slides under the read head prior to the card engaging stop 42 mounted on the carriage assembly 24. Magnetic read head 40 is attached to the carriage assembly 24 through a flexible spring arm 60 such that the head is cantilevered in front of the carriage assembly and slightly forward of the stop 42. This flexible arm 60 is attached to the carriage assembly 24 by a two-point attachment 62 and 64 such that the action of inserting the card 12 into the interface 20 pushes the magnetic read head 40 upwardly against the bias of the flexible arm 62. The read head 40 is positioned such that during the insertion of the card 12 into the interface 20, the front portion of the magnetic read head 40 is raised and rides on top of the front edge of the card. Although the card lifts the head up, the card does not go in far enough to cause the head to pick up any signal from the magnetic stripe. With this structure, pickup positions of the head are raised and do not contact the base during the insertion of the card into the slot and movement of the carriage from the initial to the second positions. The magnetic head is still positioned such that the pick-ups fully sweep the magnetic stripe when the carriage is released. In order to aid in the guiding of the card into the interface, the base 22 is provided with grooves or guides 66 to accept the edges of the card 12 while it is inserted into the interface. These grooves or guides 66 provide for proper positioning and alignment of the card 12 in the interface 20 for the read operation as well as allowing for some straightening of the card 12 if it is bent. As the card 12 is pushed into the interface 20, the card 12 contacts the card engaging stop 42 and forces the carriage assembly 24 to move with the card. This forced movement increases the loading of torsion spring 34 through the rotation of the end 36 of the spring 34 attached to the roller gear 26. Roller gear 26 rotates as the carriage is moved due to its meshing relationship with rack gear 30.

As the carriage assembly 24 is moved rearwardly by the insertion of the card 12, the flexible arm 44 rides along the ratchet teeth 47 rising slightly as the arm rides on the forward camming surface of each tooth 47 and then returning to the rest position as it drops over the stop on the ratchet tooth. In this way, should the user release the pressure forcing the card into the interface, the flexible arm will engage the stop of the adjacent ratchet tooth and prevent the carriage assembly from returning to the initial position. The provision of the ratchet teeth also aids in the insertion of the card in another way in that initially the user will typically grip the card between their thumb and forefinger to insert the card into the slot of the interface. However, depending upon the design of the reader, it may be difficult for the user to fully insert the card when it is gripped in this manner. By providing the teeth and flexible arm, which cooperate to hold the carriage assembly and card in an intermediate position, the user is able to release his grip on the card and reposition the grip to more easily push the card fully into the interface. When the card 12 is fully inserted into the interface 20, the card engaging stop 42 contacts the ramp 48 which causes the card engaging stop 42 and attached flexible arm 44 to be lifted upwardly thereby being released from engagement with the edge of the card 12 and the ratchet teeth 46 respectively. This arrangement defines an actuation structure that releases the carriage assembly and allows the carriage assembly 24 to be driven over the card. The carriage is driven to the initial position by the roller gear 26 which rotates under the influence of the loaded torsion spring 34 and meshing with the rack. During the return of the carriage assembly 24, the stop 42 slides along the upper surface of the card 12 maintaining the flexible arm 44 in a clear position above the ratchet teeth 46. During the return of the carriage assembly 24 to its initial position, magnetic read head 40 slides along the magnetic stripe 14 on the card 12 maintaining proper reading contact with the stripe 14 through the biasing of the flexible arm 60 thereby reading the information contained on the magnetic stripe 14. When the carriage assembly 24 returns to its initial position, the card 12 may be removed from the interface 20 ready to be used for other reads. Removal of card allows arm 60 to return to its original condition.

The interface 20 may also be utilized with Smart cards by incorporating an appropriate contact area 58 on the base 22 for providing electrical contact with the Smart card for reading and writing of the information contained on the IC chip of the Smart card. Typically contact is made as the card approaches the second position where the card is fully inserted in the slot. Contact interface 58 is provided with a card gripping guide 68 to grip the top surface of the card and a suitable contact 70 is made with the contact areas on the lower surface of Smart card. The gripping area 68 and contact 70 may be biased by means of springs (not shown) such that during the insertion of the card, the gripping region 68 and contact area 70 are biased upwardly to increase the contact force between the contact area 70 of the interface and the contact area of the Smart card.

Figure 12:
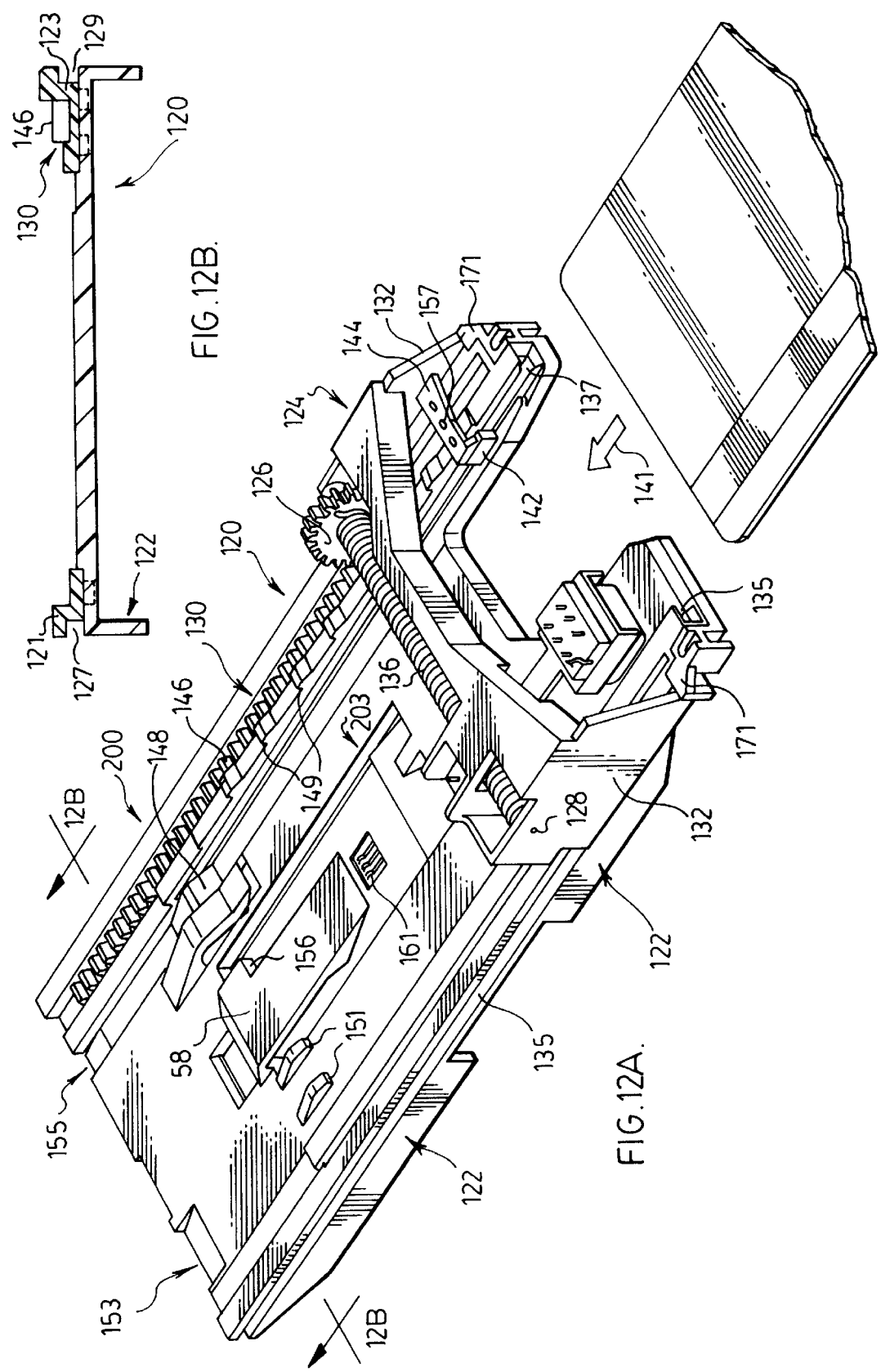
FIG. 12A shows the working components of an alternate transaction terminal.
FIG. 12B is a sectional view taken along line B—B of FIG. 12A.

A modified embodiment of the invention is shown in FIGS. 12A and 12B. The main difference between this embodiment and the earlier embodiments is the separation of certain components, in particular, the main components which are in engaging or sliding contact with the bridge member. Different materials are used which improve the operation of the terminal.

The financial transaction terminal 120 basically comprises a base 122, two opposed specialized rail portions 121 and 123, and the carriage 124. The drive gear 126, carried on axle 128, engages the teeth of rack 130, which rack is part of the rail 123. The series of ratchet teeth 146 are also part of the rail member 123. This member is preferably made of acetal, which is commonly referred to as DELRIN™. The rail 121 is also made of this material as is gear 126. The material has a somewhat oily feel and provides self-lubrication and results in lower friction. Other similar materials can be used. The rails are therefore preferably made of a self-lubricating type material. Rail 121 includes slot 135 and rail 123 includes slot 137. These slots act as guides for the sides of card 131.

The carriage 124 and the base 122 are made of a polycarbonate and the preferred material is LEXAN™. The carriage 124 has side portions 132 which include pin type members provided at the corners of each of the side members which pin type members are received within the slot 127 and a similar slot 129 in the rail members 121 and 123, respectively. These pin members slide within the slots and form a low friction relationship therewith. Similarly, the free arm 144 with the downwardly extending stop 142 also slides over the ratchet teeth 146 in a low frictional manner when the carriage is forced by a card in the direction of arrow 141. The free arm 144 does engage the various stop portions 149 to lock the carriage as it is partially moved by a card towards the rear release position 200. The stop 142 at the release position 200 rides over the credit card and the carriage moves rapidly from the release position towards the initial position with the read head reading the magnetic stripe. The stop 142 includes a shoe which is preferably made of acetal with some TEFLON™. The preferred material is sold as DELRIN AF™.

The base 122 also includes ramps 153 and 155 which allow the torsion spring 136 of the carriage 124 to be prewound and slide into the base 122. Basically, these ramps allow for the stop member 142 to be moved upwardly and also to allow the magnetic head 140 to be urged upwardly. Preferably, the rails 121 and 123 are snap fitted onto the base 122. This again simplifies manufacture.

A further feature of the carriage 124 is the free arm 144 which has been provided with a series of ports 157 to control the strength of the arm. This arrangement allows for controlled upward flexing of the arm as it moves over the ratchet teeth while providing good snap down to position the arm behind the stop faces of the ratchet teeth.

It is has been found that the carriage with a suitable torsion spring, which is prewound to maintain a bias of the carriage against the stops 171 of the base 122, can produce speeds of the head as it moves across the card in the range of 5 to 50 inches per second. As can be appreciated, the initial speed of the carriage is low at the release position and continues to build from the release position 200 at cam 148 towards the stops 171. This arrangement provides velocity and acceleration characteristics which are more than sufficient for consistent reading by the magnetic head 140 of the magnetic stripe.

Another useful feature of the present invention is the fact that the card, when inserted by the user, requires the user to fully insert the card until it bottoms out against stops 151 and 156. The magnetic head is raised by the sloped surfaces immediately adjacent stops 151 in preparation for reading of the magnetic stripe. As the card reaches stops 151 and 156, the carriage is released and the magnetic head is forced along the magnetic stripe of the card. Release of the carriage occurs as the card engages the stops as stop 142 clears the end edge of the card. The stop 142 is moved upward due to contact with cam 148 on the base 122. The card upon reaching the release position is also engaged by electrical contacts 161 for connecting with an integrated circuit of a Smart card. The base 122 includes a central port 203 which receives the Smart card contact mechanism. The card, upon reaching the carriage release position 200, also causes contacts 161 to connect to the integrated circuit. There are a number of commercially available Smart card interfaces which can be used. With this arrangement, the user merely appropriately inserts the card fully and this action results in reading a magnetic stripe, if present, and connection to a Smart card integrated circuit, if present. Therefore, the same transaction terminal is used for both Smart cards and magnetic stripe cards, but more importantly, a user of a Smart card and a user of a magnetic stripe card inserts the card in the same manner, knowing that, when it bottoms out at the end, this is the position that the device uses to interpret the information on the card. This positive and consistent mode of operating is independent of the speed at which the card is inserted into the device. The user must merely insert the card to bottom out at the end of the slot and at this point he knows that the card is properly inserted, assuming that the orientation is correct. This is highly desirable, as the instructions for using the device are the same for both types of cards or integrated cards. This standardization has been achieved with a manual type device where insertion of the card provides the power for driving of the carriage.

The release of the carriage 124 occurs where the stop 142, when raised by the cam 148, clears the front edge of card 131 and then rides across the upper surface of the card. The desirable material for stop 142 and the free arm 144 are different, and therefore, a shoe is applied to the end of arm 144. In this way, the best material for the arm and the shoe is possible.

Figures 13, 14:
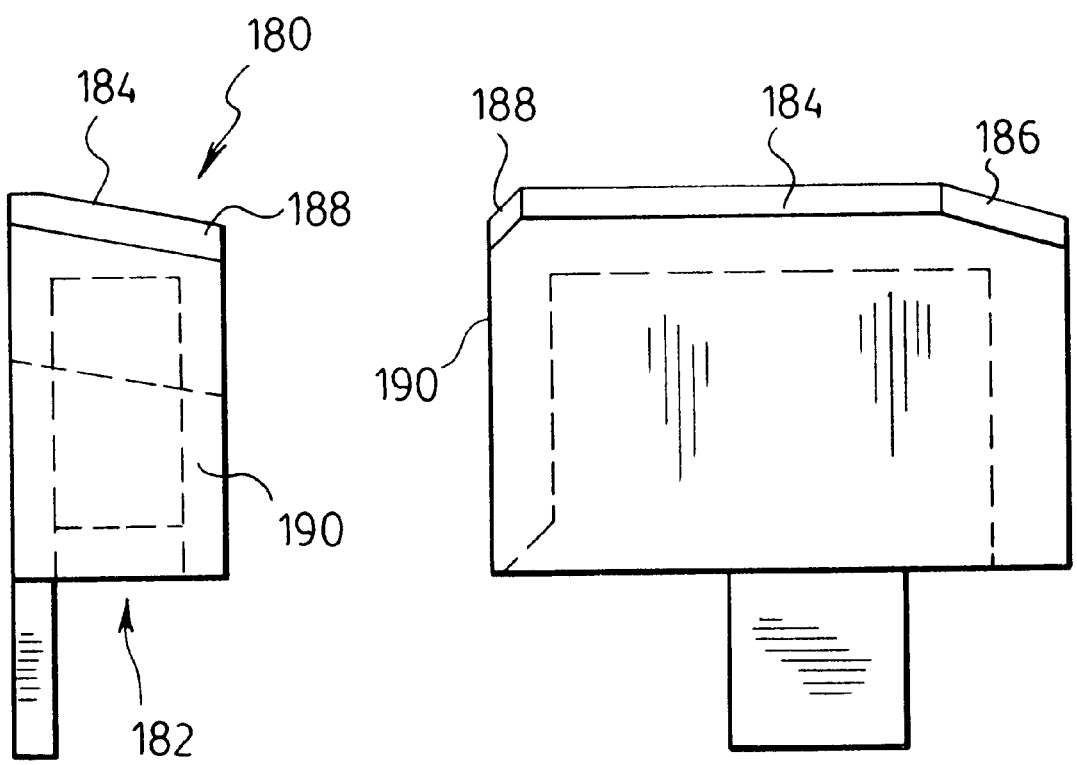
FIG. 13 is an end view of a low friction shoe.
FIG. 14 is a side view of the low friction shoe of FIG. 13.

Details of the shoe are shown in FIGS. 13 and 14. The shoe 180 includes a pocket 182 for receiving a downwardly turned end of the free arm 144 and serves to retain the shoe on the arm. Surface 184 engages the card to surface and is angled to account for the angle of the arm when the carriage is released. Surface 184 will be coplanar with the card surface at this time. Surface 186 engages cam 148 and is at a similar angle to distribute the upward force on the arm. Surface 188 acts as a cam which urges the arm to clear the card quickly when the arm is almost clear. The front edge of the card moves along edge 190 and when it reaches surface 188 the arm is urged upwardly by cam surface 188. A low friction, noncard-damaging relationship is achieved. This is important as the terminal should not mark the card, but the arm requires sufficient spring force to lock behind the stop portions 149 of the ratchet teeth. The shoe material and design distributes the force of the arm to a larger area and forms a low friction relationship with the card.

The present invention provides for a simple manually operated card interface which significantly reduces the human factors known to cause reading errors. The interface is compact to allow the foot print of the reader to be small and/or allow more room for other components. This structure also allows good access to both top and bottom surfaces of a card for convenient electrical contact therewith.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A transaction terminal for cooperating with transaction cards including magnetic stripe cards and cards having an integrated circuit for storing data, said transaction terminal having a card entry slot for receiving an oriented transaction card and guiding said card to a read position, a manually movable carriage biased towards said card entry slot and movable with a transaction card away from an initial position at said entry slot to a carriage release position when a card is inserted in said slot and moved by a user to said read position and said transaction card remains at said read position, said carriage including a read head positioned for reading said magnetic stripe on said transaction card when said carriage moves under said bias form said carriage release position to said initial position, said transaction terminal including electrical connectors positioned to engage and form an electrical circuit with an integrated circuit of a transaction card when the transaction card moves to said read position, said transaction terminal cooperating with transaction cards having magnetic stripes and cooperating with transaction cards having integrated circuits such that each transaction card inserted to the read position has said carriage and magnetic head moved from said release position to said initial position and said electrical connectors contact said transaction card and form an electrical circuit with an integrated circuit, if present on the transaction card; and wherein said transaction terminal, between said initial position and said release position, includes at least one hold position stopping said carriage from returning to said initial position before being released at said release position.

2. A transaction terminal as claimed in claim 1 wherein said carriage slides over a base and the base receives the transaction cards, said base further includes ratchet teeth with each ratchet tooth forming one of said hold positions, said carriage including a free arm which cams over the ratchet teeth when said carriage is moved from said initial position to said release position, said free arm at said release position cooperating with said card and a cam on said base to move to a position clear of said ratchet teeth allowing said carriage to move from said release position to said initial position when a card is in said read position.

3. A transaction terminal as claimed in claim 1 wherein said terminal includes a plurality of hold positions and said base includes a series of cams with each cam having an associated stop face defining one of such hold positions, each cam and stop face cooperating with a spring arm of said carriage, said spring arm being forced upwardly by said cams and locking with one of said stop faces if the carriage stops during movement from said initial position to said carriage release position; said spring arm at said carriage release position being located clear of said stop faces and cams and maintained clear thereof during movement of said carriage from said carriage release position to said initial position.

4. A transaction terminal for cooperating with transaction cards having a magnetic stripe from which encoded data can be read, said transaction terminal having a card entry slot for receiving an orientated transaction card and guiding said card to a read position where said card is stationary, a manually movable carriage biased towards said card entry slot and movable with a transaction card away from an initial position at said entry slot to a carriage release position when a card is inserted in said slot and moved by a user to said read position and said transaction card remains at said read position, said carriage including a read head positioned for reading said magnetic stripe on said transaction card when said carriage moves under said bias from said carriage release position to said initial position, and wherein said transaction terminal, between said initial position and said release position, includes at least one hold position stopping said carriage from returning to said initial position before being released at said release position.

5. A transaction terminal as claimed in claim 4 wherein said carriage is attached to and guided by side rails located either side of a base member and said carriage traverses said base.

6. A transaction terminal as claimed in claim 5 wherein said base includes a fixed rack member adjacent one of said side rails which cooperates with a drive gear rotatably supported by said carriage, said carriage further including a power storage arrangement which stores power as said carriage is moved from said initial position to said carriage release position and said power storage arrangement powers said drive gear to cause said drive to move said carriage rapidly from said carriage release position to said initial position.

7. A transaction terminal as claimed in claim 6 wherein said side rails, said fixed rack member and said drive gear are all of a self-lubricating plastic material.

8. A transaction terminal as claimed in claim 6 wherein said side rails and said rack are snap fitted onto said base.

9. A transaction terminal as claimed in claim 6 wherein said power storage arrangement uses the rotation of said drive gear as said carriage is moved from said initial position to said carriage release position for providing power to be stored by said power storage arrangement.

10. A transaction terminal as claimed in claim 9 wherein said carriage includes a spring arm with a stop foot which engages the leading edge of a transaction card inserted in said transaction terminal, said stop foot at said carriage release position engaging a fixed cam on said base which reuses said stop foot against a bias force provided by said spring to a position to allow said stop foot to move past said leading edge and release said carriage.

11. A transaction terminal as claimed in claim 10 wherein said stop foot rides over said card as said carriage moves from said read position to said initial position.

12. A transaction terminal as claimed in claim 11 wherein said stop foot has a shoe of a low friction material in contact with said transaction card to reduce friction therebetween.

13. A transaction terminal as claimed in claim 10 wherein said spring arm cams past stop faces during movement from said initial position to said carriage release position and engages a stop face, restricting movement back to said initial position before reaching said carriage release position, said spring arm at said carriage release position being moved to a position clear of said stop faces, allowing said carriage to move rapidly to said initial position.

* * * * *